(12) United States Patent
Heo

(10) Patent No.: US 8,617,729 B2
(45) Date of Patent: Dec. 31, 2013

(54) BATTERY PACK

(75) Inventor: Sangdo Heo, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 397 days.

(21) Appl. No.: 12/219,001

(22) Filed: Jul. 14, 2008

(65) Prior Publication Data

US 2009/0081485 A1    Mar. 26, 2009

(30) Foreign Application Priority Data

Sep. 21, 2007    (KR) ........................ 10-2007-0097034

(51) Int. Cl.
*H01M 14/00*    (2006.01)

(52) U.S. Cl.
USPC ................. 429/7; 429/163; 429/175

(58) Field of Classification Search
USPC ................. 429/7, 12, 163, 175, 177, 185
See application file for complete search history.

(56) References Cited

U.S. PATENT DOCUMENTS

| | | | | |
|---|---|---|---|---|
| 6,205,034 B1 * | 3/2001 | Zayatz | ........................ | 361/824 |
| 6,426,867 B1 * | 7/2002 | Zayatz | ........................ | 361/626 |
| 6,461,763 B1 * | 10/2002 | Witzigreuter et al. | ........ | 429/163 |
| 7,476,463 B2 * | 1/2009 | Desilvestro et al. | .......... | 429/152 |
| 2005/0153172 A1 * | 7/2005 | Han | .................... | 429/7 |
| 2006/0083982 A1 * | 4/2006 | Jung et al. | ..................... | 429/164 |
| 2006/0266542 A1 * | 11/2006 | Yoon | ........................... | 174/112 |
| 2009/0081485 A1 * | 3/2009 | Heo | ................................. | 429/7 |

FOREIGN PATENT DOCUMENTS

| | | |
|---|---|---|
| JP | 2004-273371 | 9/2004 |
| JP | 2005-183242 | 7/2005 |
| JP | 2006-193669 | 7/2006 |
| KR | 1020040085478 A | 10/2004 |
| KR | 1020050012752 A | 2/2005 |
| KR | 1020060084888 | 7/2006 |
| KR | 1020060110405 | 10/2006 |

* cited by examiner

*Primary Examiner* — Raymond Alejandro
(74) *Attorney, Agent, or Firm* — Robert E. Bushnell, Esq.

(57) ABSTRACT

Disclosed is a battery pack that enables its outer case to be formed in small thickness regardless of formability and material property, and has enhanced twisting resistance. The battery pack includes a bare cell for generating electricity, a circuit member provided at an upper part of the bare cell and electrically coupled to the bare cell, a frame case formed so as to expose front and back parts of the bare cell externally while covering the bare cell including the circuit member, and a film sheet connected to the frame case so as to cover the front and back parts of the bare cell.

13 Claims, 5 Drawing Sheets

BATTERY PACK

CLAIM FOR PRIORITY

This application makes reference to, incorporates the same herein, and claims all benefits accruing under 35 U.S.C. §119 from an application earlier filed in the Korean Intellectual Property Office on 21 Sep. 2007 and there duly assigned Serial No. 10-2007-0097034.

BACKGROUND OF THE INVENTION

1. Field of the Invention

The present invention relates to a secondary battery, and more particularly, to a battery pack that enables its outer case to be formed in small thickness regardless of formability and material property and has enhanced twisting resistance.

2. Description of the Related Art

Generally, a battery pack uses a chargeable/dischargeable secondary battery because of its low cost. The secondary batteries include a nickel-cadmium (Ni—Cd) battery, a nickel-hydride (Ni-MH) battery, a lithium (Li) battery, a lithium-ion (Li-ion) battery and a lithium polymer battery.

The battery pack is usually constituted of a chargeable/dischargeable bare cell, a protection circuit board electrically coupled to the bare cell so as to control charging/discharging and interrupt the circuit in a case of over-charge/discharge, a resin filled between the bare cell and protection circuit board so as to prevent the protection board from being separated from the bare cell, and an outer case formed in a shape mountable on an external set while packing the bare cell, protection circuit board and resin.

The battery pack is manufactured by connecting a lead to a positive electrode of a bare cell and connecting a PTC thermistor to a negative electrode, and electrically connecting a protection circuit board to the lead and PTC thermistor. Next, a resin is filled in a gap between the protection circuit board and bare cell so as to mechanically fix the protection circuit board to the bare cell, thereby preventing the protection circuit board from being separated from the bare cell. The integrated bare cell and protection circuit board are packed by an outer case having a shape mountable on an external device. Herein, the outer case is formed integrally with the bare cell, protection circuit board and resin by being molded with other resin.

The battery pack should be small in size and slim in shape for matching the small size and lightweight of electronic devices. Structure of the outer case constituting an appearance of the battery pack is important for making the battery pack slim.

In other words, slim shape of the battery pack can be determined by thickness of each of the bare cell battery, protection circuit board and outer case. The larger a capacity of the bare cell battery is, the thicker battery pack becomes. Thus, the thickness of the outer case should be thin for high capacity and slim shape of the battery pack.

However, in the case of an outer case formed by using an integrated type molding in a contemporary battery pack, there is a limitation to reduce the thickness of the outer case by formability and material property which are technical restrictions in an injection molding method. For example, it is actually difficult to make minimum thickness of the outer case smaller than 0.22 mm in the contemporary battery pack. Further, because the outer case of the contemporary battery pack is integrally formed, it is relatively weak to twisting.

SUMMARY OF THE INVENTION

Accordingly, an object of the present invention is to provide a battery pack that enables its outer case to be formed in a small thickness regardless of formability and material property which are technical restrictions in an injection molding method.

Another object of the present invention is to provide a battery pack that has enhanced twisting resistance.

Additional advantages, objects and features of the invention will be set forth in part in the description which follows and in part will become apparent to those having ordinary skill in the art upon examination of the following or may be learned from practice of the invention.

According to an aspect of the present invention, there is provided a battery pack, which includes a bare cell for generating electricity, a circuit member provided at an upper part of the bare cell and electrically coupled to the bare cell, a frame case covering the bare cell and the circuit member, a front surface of the frame case having a front opening, a front part of the bare cell being exposed through the front opening of the frame case, and a first film sheet coupled to the frame case and covering the front part of the bare cell.

Both of the frame case and the first film sheet may be formed of the same insulating material, and each of the frame case and the first film sheet can be formed of PC (polycarbonate), PETG (polyethylene terephthalate glycol), PE (polyethylene), PP (polypropylene), or ABS (acrylonitrile-butadiene-styrene).

A back surface of the frame case may have a back opening. A back part of the bare cell may be exposed through the back opening of the frame case. The battery pack may further include a second film sheet coupled to the frame case and covering the back part of the bare cell. Each of the first and second film sheets may be formed in thickness of about 0.1 mm to 0.15 mm.

The frame case may include a plane surface part covering the upper part, side parts, and a lower part of the bare cell, and may include a front stepped part formed along an edge portion of the front opening. The front stepped part may be stepped inwards from the front surface of the frame case.

A depth of the front stepped part below the front surface may be substantially the same as the thickness of the first film sheet. The frame case may further include a welding projection formed on the stepped part. The frame case and the first film sheet may be combined with each other by ultrasonic welding conducted between the welding projection of the frame case and the thin film sheet.

The frame case may further include an upper opening part formed in a region of the plane surface part of the frame case corresponding to an external terminal part included in the circuit member so as to expose the external terminal part. The frame case may further include a locker formed on one side of the upper opening and a hook formed on another side of the opening part of the frame case so as to connect the battery pack to an external device physically.

A round part may be formed in a region where the plane surface part of the frame case contacts with the stepped part.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF EXEMPLARY EMBODIMENTS

Figure 1:
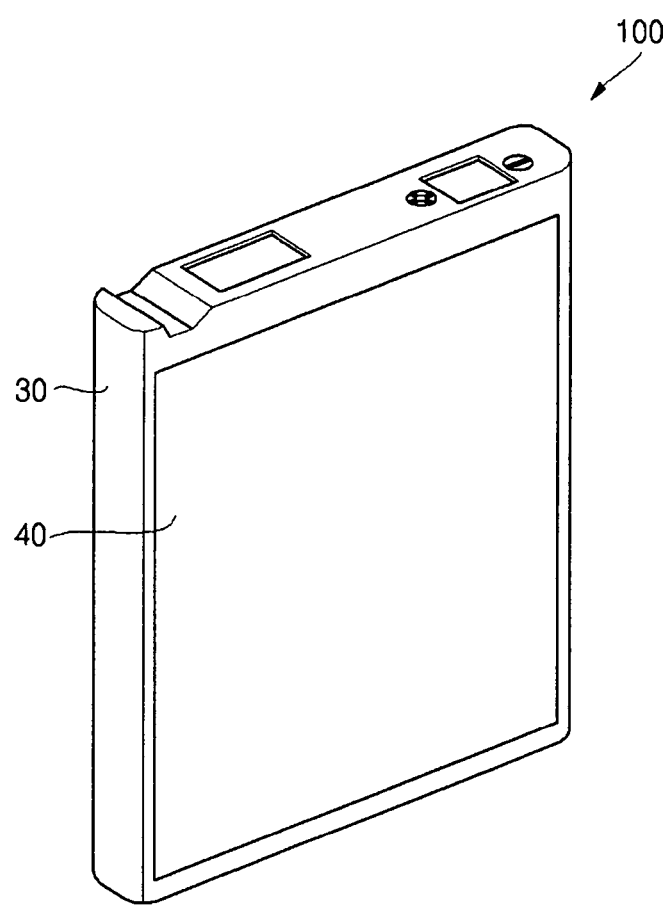
FIG. 1 is a perspective view illustrating an assembled battery pack according to one exemplary embodiment of the present invention.

Hereinafter, preferred embodiments of the present invention will be described in detail with reference to the accompanying drawing. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 2:
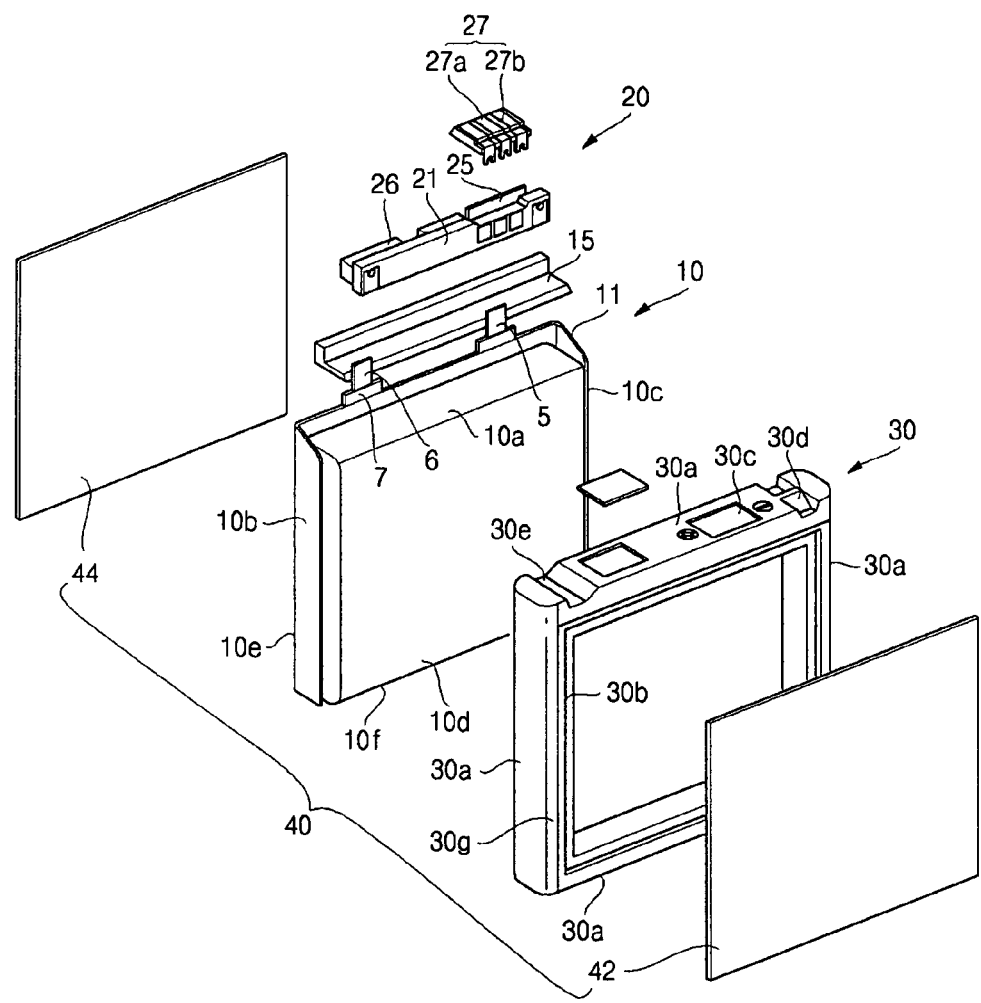
FIG. 2 is an exploded perspective view illustrating the battery pack of the present invention.

FIG. 1 is a perspective view illustrating an assembled battery pack according to one exemplary embodiment of the present invention and FIG. 2 is an exploded perspective view illustrating the battery pack of the present invention.

Referring to FIGS. 1 and 2, the battery pack 100 includes a chargeable/dischargeable bare cell 10 for generating electricity, a circuit member 20 electrically coupled to the bare cell 10 so as to control charge/discharge and interrupt a circuit in the case of over-charge/discharge, a frame case 30 packing the bare cell 10 and the circuit member 20, and a thin film sheet 40 including first and second film sheets 42 and 44 coupled to the frame case 30. The bare cell 10 may be pouch or can type. In the embodiment, a pouch type bare cell will be explained for an example.

Figure 3:
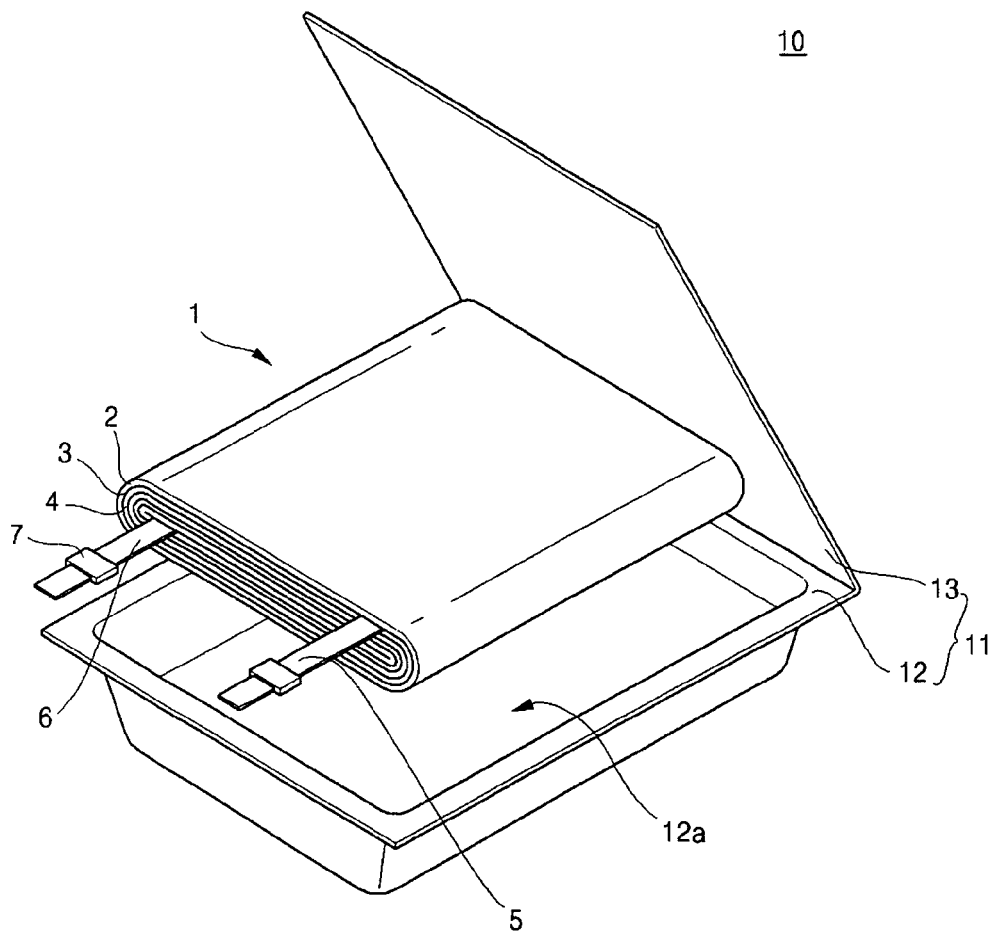
FIG. 3 is an exploded perspective view illustrating a pouch type bare cell of the battery pack.

FIG. 3 is an exploded perspective view illustrating a pouch type bare cell of the battery pack. Referring to FIG. 3, the bare cell 10 includes an electrode assembly 1 and a pouch case 11 receiving the electrode assembly 1.

The electrode assembly 1 includes a positive electrode plate 2 whose both surfaces are coated with a positive electrode active material, a separator 3, and a negative electrode plate 4 whose both surfaces are coated with a negative electrode active material.

A positive electrode tab 5 is bonded to the positive electrode plate 2 while being protruded in a predetermined length so as to function as a positive electrode. A negative electrode tab 6 is bonded to the negative electrode plate 4 while being protruded in a predetermined length so as to function as a negative electrode. The electrode assembly 1 may be further include an insulation tape 7 for preventing an electrical short between two of the positive electrode tab 5 and negative electrode tab 6 and pouch case 11. The positive electrode and negative electrode tabs 5 and 6 are withdrawn out through any one side of the pouch case 11, and electrically coupled to a circuit member 20, that will be described below.

Hereinafter, a withdrawal direction of the positive electrode and negative electrode tabs 5 and 6 of the bare cell 10 is referred to as an upper part of the bare cell 10.

The pouch case 11 includes a front surface 12 and a rear surface 13 connected to the front surface 12. A cavity 12a for receiving the electrode assembly 1 is formed on the front surface 12 through a press process. The electrode assembly 1 is mounted on the cavity 12a formed on the front surface 12 of the pouch case 11. In this case, end parts of the positive electrode and negative electrode tabs 5 and 6 withdrawn from each electrode plate 2 and 4 are exposed out of the pouch case 11. After the electrode assembly 1 is mounted on the front surface 12 of the pouch case 11, the front surface 12 of the pouch case 11 is covered by the rear surface 13 and thermally welded along a periphery of the cavity 12a. Thus, the front and rear surfaces 12 and 13 of the pouch case 11 are combined and sealed, thereby completing a pouch type bare cell of a battery.

Referring to FIG. 2, the circuit member 20 is arranged at an upper part 10a of the bare cell 10 and includes a printed circuit board 21. The printed circuit board 21 includes an electrically formed protection circuit such as a circuit (not shown) equalizing a charge state by controlling charge/discharge of the battery or a circuit (not shown) preventing over-charge/discharge. Also, the circuit member 20 may include a protection element such as a thermistor or a thermal fuse, which prevents a malfunction such as breakdown and firing, etc. by cutting off current in the case that voltage or current of the battery becomes higher than a standard level due to high temperature rise or over-charge/discharge of the battery etc. The circuit member 20 further includes electrical connection terminals 25 and 26 provided on the printed circuit board 21 for an electrical coupling with the electrode tabs 5 and 6 of the bare cell 10.

The circuit member 20 is provided for communicating electrical signals between the bare cell 10 and an external device (not shown). For this purpose, the circuit member 20 further includes an outer input/output terminal 27 in the upper part thereof for functioning as an electrical medium between the circuit member 20 and external device. The outer input/output terminal 27 includes a metal part 27a and a housing part 27b surrounding the metal part 27a. The metal part 27a is plated by gold that is an electrically conductive material, and enables an electrical signal to be transferred between the bare cell 10 and an external device (not shown). The housing part 27b is made of a plastic that is an insulating material and insulates the metal parts 27a interposed with a predetermined space in the housing part 27b from each other.

An insulation sheet 15 may be further formed on an upper end surface of the bare cell 10 so as to prevent an electrical short caused by unnecessary connection between the circuit member 20 and bare cell 10.

As described above, a frame case 30 is combined to the bare cell 10 that is electrically coupled with the circuit member 20 through the electrode tabs 5 and 6 so as to form a part of appearance of the battery pack.

Referring to FIG. 2, the frame case 30 covers the upper part 10a of the bare cell 10 on which the circuit member 20 is arranged, a lower part 10f and a pair of side parts 10b and 10c of the bare cell 10. The frame case 30 is formed in a frame shape in a manner that a front surface of the frame case 30 partially covers side corners of a front part 10d of the bare cell 10, and a back surface of the frame case 30 partially covers side corners of the back part 10e of the bare cell 10. The front surface of the frame case 30 has a front opening, through which the front part 10d of the bare cell 10 is exposed. The back surface of the frame case 30 has a back opening, through which the back part 10e of the bare cell 10 is exposed. The frame case 30 forms a light-weighted and slim outer case together with the thin film sheet 40.

The frame case 30 includes a plane surface part 30a and a stepped part 30b. The frame case 30 may further include an upper opening part 30c, a locker 30d, a hook 30e and a round part 30g. The plane surface part 30a of the frame case 30 is formed so as to cover the upper part 10a, the pair of side parts 10b and 10c, and the lower part 10f of the bare cell 10. Here, the plane surface part 30a of the frame case 30 may have the same width regardless of a portion of the plane surface part that covers the upper part 10a, the side parts 10b and 10c, or the lower part 10f of the bare cell 10.

The stepped part 30b of the frame case 30 is formed along an edge portion of the front opening or back opening of the frame case 30. If the stepped part is formed on the front surface of the frame case 30, it can be referred to as a front stepped part, and if the stepped part is formed on the back surface of the frame case 30, it can be referred to as a back stepped part. The stepped part 30b extended from an end part of the plane surface part 30a to an inside of the frame case 30, and is stepped inwards from the front or back surface of the frame case 30.

At least one upper opening part 30c of the frame case 30 is formed in the region of the plane surface part corresponding to the outer terminal part 27 provided on the printed circuit board 21 of the circuit member 20 arranged at the upper part 10a of the bare cell 10 so as to expose the external terminal part 27.

The locker 30d is formed on one side of the upper opening 30c, and hook 30e is formed on another side of the upper opening 30c so as to be physically connected to an external device.

The round part 30g of the frame case 30 is formed with a predetermined radius in a region where the plane surface part 30a contacts stepped part 30b so as to smoothly mount the battery pack 100 on an external device. However, the round part 30g may not be formed in the region where the plane surface part 30a contacts stepped part 30b, and the plane surface part 30a and stepped part 30b may be directly connected with each other without the round part 30g. In this case, a cross-section of the frame case 30, when viewed from the top, may have a rectangular shape.

The frame case 30 may be formed of any insulating resin selected from PC (polycarbonate), PETG (polyethylene terephthalate glycol), PE (polyethylene), PP (polypropylene) and ABS (acrylonitrile-butadiene-styrene).

Each of the first and second film sheets 42 and 44, which form the thin film sheet 40, is combined with the frame case 30 so as to form the outer case of the battery pack 100.

Particularly, the first film sheet 42 is coupled to the front surface of the frame case 30 so as to face the front part 10d of the bare cell 10, and the second film sheet 44 is coupled to the back surface of the frame case 30 so as to face the back part 10e of the bare cell 10. In other words, the first film sheet covers the front part 10d of the bare cell that is exposed through the front opening of the frame case 30. The second film sheet covers the back part 10e of the bare cell 10 that is exposed through the back opening of the frame case 30. FIG. 2 shows both of the first film sheet and the second film sheet, but it is also possible to have only one film sheet. In this case, the frame case 30 may have only a front opening or a back opening.

The first and second film sheets 42 and 44 may be formed of the same material as the frame case 30, for example, any insulating resin selected from PC (polycarbonate), PETG (polyethylene terephthalate glycol), PE (polyethylene), PP (polypropylene) and ABS (acrylonitrile-butadiene-styrene). The first and second film sheets 42 and 44 are formed of the same material as the frame case 30 to enhance bonding property between them when each of the first and second film sheets 42 and 44 is combined with the frame case 30 by welding. On the other hand, the first and second film sheets 42 and 44 are formed of the insulating resin to prevent an electrical short between circuits, which may occur in the case of a conductive material, because the first and second film sheets 42 and 44 directly contact the circuit member 20 and bare cell 10. Here, each of the first and second film sheets 42 and 44 is formed in a thickness of about 0.1 mm to 0.15 mm. If each of the first and second film sheets 42 and 44 is too thin, such as less than 0.1 mm, the first or the second film sheet may not resistant to an external force. If the thickness of each of the first and the second film sheet is greater than 0.15 mm, thickness of the battery pack 100 increases.

Figure 4:
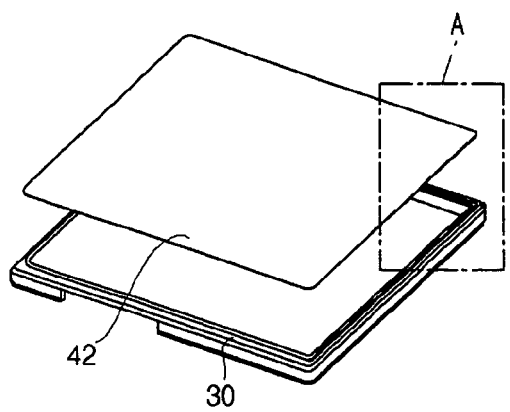
FIG. 4 is a perspective view illustrating a state before a frame case of the battery pack is welded to a first thin film sheet.
Figure 5:
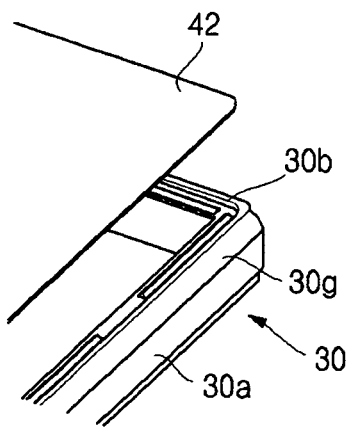
FIG. 5 is an enlarged perspective view illustrating an 'A' portion of FIG. 4.
Figure 6:
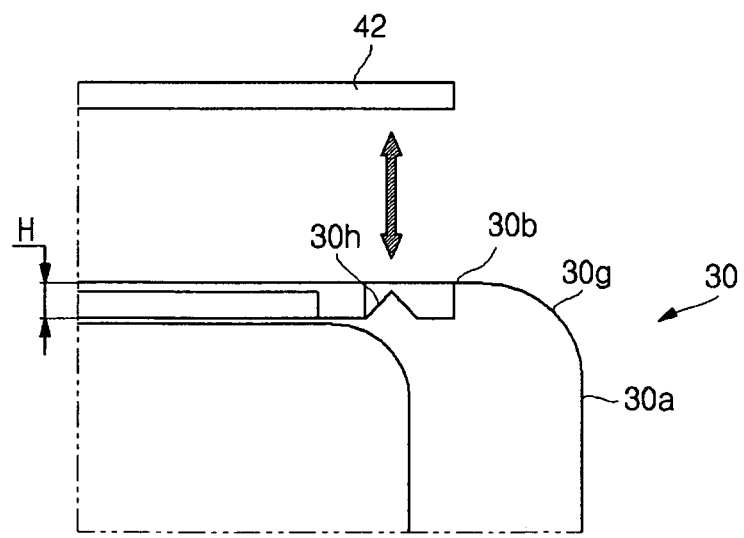
FIG. 6 is a sectional view illustrating a state before the frame case of the battery pack is welded to the first thin film sheet.

A combined structure of the frame case 30 and the first film sheet 42 will be explained for an example of a combination of the frame case 30 and film sheet. FIGS. 4 to 6 shows a shape before the first film sheet 42 is welded to the frame case 30, and FIGS. 7 and 8 shows a shape after the first film sheet 42 is welded to the frame case 30 connected to the bare cell 10.

Referring to FIGS. 4 to 6, the frame case 30 may further include a welding projection 30h formed on the stepped part 30b of the frame case 30 contacting the first film sheet 42. The welding projection 30h supports ultrasonic welding when the frame case 30 and first film sheet 42 are combined with each other by the ultrasonic welding. A sectional shape of the surface of the welding projection 30h may be formed in a triangular shape. The first film sheet 42 is combined with the stepped part 30b of the frame case 30. Herein, when the first film sheet 42 and frame case 30 are combined with each other so as to form a part of the outer case, it is preferable for making the outer case thinner in a manner that a depth H of the stepped part 30b is substantially the same as the thickness of the first film sheet 42.

Figure 7:
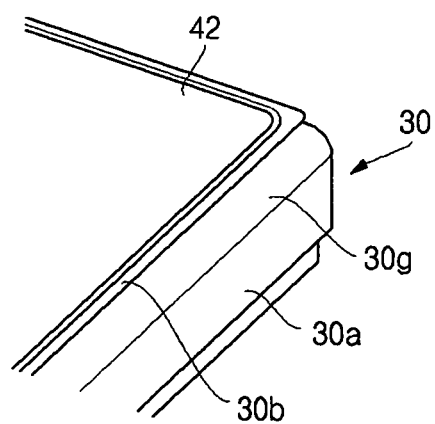
FIG. 7 is a perspective view illustrating a state after the frame case of the battery pack is welded to the first thin film sheet.
Figure 8:
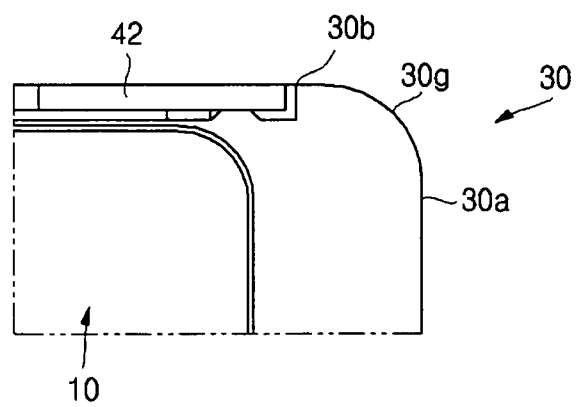
FIG. 8 is a sectional view illustrating a state after the frame case of the battery pack is welded to the first thin film sheet.

Referring to FIGS. 7 to 8, the frame case 30 and first film sheet 42 are combined with each other by ultrasonic welding of the welding projection 30h of the frame case 30 and the first film sheet 42. Here, the first film sheet 42 is combined with the frame case 30 by ultrasonic welding, but may be combined with the frame case 30 by an adhesive.

The principles of combining the second film sheet 44 with frame case 30, which are not shown in FIGS. 4 to 8, are the same as those of the first film sheet 42 and frame case 30. Thus, an explanation about them will be omitted.

As described above, the battery pack 100 according to the present invention produces the following effects.

First, the outer case of the battery pack is formed by combining the first and second film sheets 42 and 44 formed of thin sheets with the frame case 30, thereby being formed in minimum thickness of, for example, 0.10 to 0.15 mm, which is thinner than the contemporary outer case formed by the injection molding method affected by the formability and material property. Thus, an effective space of the battery pack 100 increases by making the total thickness of the battery pack 100 thinner, thereby allowing the battery capacity to increase.

Second, the outer case of the battery pack 100 is formed by dividing the thin film sheet into the first and second thin film sheets 42 and 44 and combining the thin film sheets 42 and 44 with the frame case 30, thereby allowing the twisting resistance of the battery pack 100 to be relatively enhanced.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A battery pack comprising:
   a bare cell for generating electricity;
   a circuit member provided at an upper part of the bare cell and electrically coupled to the bare cell;
   a frame case covering the bare cell and the circuit member, a front surface of the frame case having a front opening, a front part of the bare cell being exposed through the front opening of the frame case; and
   a first film sheet having two surfaces and four edges coupled to the frame case and covering the front part of the bare cell, the first film sheet being separated from the bare cell with a space formed between the first film sheet and the bare cell, said space preventing contact of the first film sheet with the bare cell throughout an entire one of the surfaces and all four of the edges of the first film sheet with the exception of a welding projection.

2. The battery pack of claim 1, wherein each of the frame case and the first film sheet is formed of a material selected from the group consisting of PC (polycarbonate), PETG (polyethylene terephthalate glycol), PE (polyethylene), PP (polypropylene), and ABS (acrylonitrile-butadiene-styrene).

3. The battery pack of claim 1, wherein a back surface of the frame case has a back opening, a back part of the bare cell being exposed through the back opening of the frame case, the battery pack further comprising:
   a second film sheet coupled to the frame case and covering the back part of the bare cell.

4. The battery pack of claim 3, wherein each of the first and second film sheets is formed in a thickness of about 0.1 mm to 0.15 mm.

5. The battery pack of claim 1, wherein the frame case includes:
   a plane surface part covering the upper part, side parts, and a lower part of the bare cell; and
   a front stepped part formed along an edge portion of the front opening, the front stepped part being stepped inwards from the front surface of the frame case.

6. The battery pack of claim 5, wherein a depth of the front stepped part below the front surface is substantially the same as the thickness of the first film sheet.

7. The battery pack of claim 5, wherein the frame case includes a welding projection formed on the front stepped part.

8. The battery pack of claim 7, wherein the frame case and the first film sheet are combined with each other by ultrasonic welding conducted between the welding projection of the frame case and the first film sheet.

9. The battery pack of claim 5, wherein the frame case includes an upper opening part formed in a region of the plane surface part of the frame case corresponding to an external terminal part included in the circuit member so as to expose the external terminal part through the upper opening.

10. The battery pack of claim 9, wherein the frame case includes a locker formed on one side of the upper opening and a hook formed on another side of the opening part of the frame case so as to connect the battery pack to an external device physically.

11. The battery pack of claim 5, wherein a round part is formed in a region where the plane surface part of the frame case contacts the front stepped part.

12. The battery pack of claim 1, wherein both of the frame case and the first film sheet are formed of the same insulating material.

13. The battery pack of claim 1, wherein the frame case includes a welding projection, the first film sheet being connected to the welding projection.

* * * * *